United States Patent [19]

Bolton et al.

[11] 4,352,353

[45] Oct. 5, 1982

[54] PROTECTIVE CLOTHING

[75] Inventors: Colin B. Bolton, Fleet; Alan J. Miles, Camberley; Robert E. Simpson, Fleet, all of England

[73] Assignee: The Secretary of State for Defence in Her Britannic Majesty's Government of the United Kingdom of Great Britain and Northern Ireland, London, England

[21] Appl. No.: 116,028

[22] Filed: Jan. 31, 1980

Related U.S. Application Data

[63] Continuation-in-part of Ser. No. 795,624, May 10, 1977, abandoned.

[30] Foreign Application Priority Data

May 14, 1976 [GB] United Kingdom ............... 20135/76

[51] Int. Cl.³ ................... A61M 15/00; A62B 18/00
[52] U.S. Cl. .................... 128/201.24; 128/201.23; 128/201.28; 128/205.24; 2/2.1 A
[58] Field of Search .................... 128/200.24, 201.23, 128/201.28, 201.24, 205.24; 2/2.1 R, 2.1 A, 8

[56] References Cited

U.S. PATENT DOCUMENTS

| | | | |
|---|---|---|---|
| 2,684,066 | 7/1954 | Glidden | 128/205.24 |
| 2,935,985 | 5/1960 | Andrews | 128/201.23 |
| 3,433,222 | 3/1969 | Pinto | 128/201.24 |
| 3,739,774 | 6/1973 | Gregory | 128/201.28 |

OTHER PUBLICATIONS

The Art Supra was cited and provided Applicant in Patent Application Ser. No. 795,624.

Primary Examiner—Donald P. Walsh
Attorney, Agent, or Firm—Cushman, Darby & Cushman

[57] ABSTRACT

A respirator comprising a hood and visor adapted to protect a wearer against an undesirable substance and so closely to fit and envelop the wearer's head as to be susceptible of being worn underneath a helmet, the visor being formed to accommodate an oronasal mask and the respirator having purge gas supply means for maintaining a positive pressure within the respirator and for washing over the visor in visual regions thereof as well as breathing gas supply means.

47 Claims, 8 Drawing Figures

PROTECTIVE CLOTHING

This is a continuation-in-part of U.S. application Ser. No. 795,624 filed May 10, 1978 now abandoned.

The present invention relates to headgear to be worn by personnel for protection against unpleasant or toxic substances in their local atmosphere, such as radioactive, chemical and/or bacterial substances. As it is fundamental to such headgear that safe breathing supplies are maintained, headgear in accordance with the invention are hereinafter called respirators.

The invention is particularly concerned with respirators to be worn by military personnel, especially aircrew. It is thus preferable that the respirator either also affords physical protection to its wearer, eg against impact or air-blast on ejection, or is compatible with a protective helmet.

According to the present invention a respirator for wearing beneath a protective helmet to protect against undesirable substances in a local atmosphere comprises a hood with a neck aperture, a visor, said hood and said visor both made of material impervious to the undesirable substance and attached one to another in a manner impervious to the undesirable substance to form a respirator assembly adapted to fit and envelop closely the head of a wearer, said visor having a transparent visual portion for covering the visual field of a wearer and breathing mask carrying portion recessed to accommodate and carry a breathing mask, a breathing mask carried by said visor mask carrying portion, means for supplying purge gas to the interior of said respirator, means for directing purge gas onto said transparent visual portion, means for permitting egress of purge gas, and seal means around the hood neck aperture for preventing atmosphere exterior thereto from reaching the interior of said respirator assembly via the neck aperture thereof.

The hood may be made of a suitable fabric supporting a material having the desired impermeability. Preferably, however, it is formed in natural or synthetic rubber of the butyl, neoprene or silicone types alone or in composites. A material thickness of 0.2 to 0.8 mm has been found not unacceptably to obstruct the hearing of the wearer or adversely to affect helmet earphone noise attenuation means, but it is preferred, for the avoidance of encumbrance and heat loading, for the hood material to be as thin as possible. Typical examples are 0.25 mm butyl and 0.3–0.4 mm butyl coated neoprene.

The means for preventing ingress of atmosphere via the neck aperture may include the natural or artificial rubber inwardly directed flange type neck seal known already in the immersion suit art. Additionally or alternatively to the neck seal the hood may have means for preventing access of external atmosphere to the wearer via between the respirator assembly and any protective garment covering the torso. This may comprise fastener means for attaching the hood to such a garment or a skirt for overlying the wearer's shoulders. This latter, which is preferred, is normally more suitable as a droplet spreader than as a seal means but bellows, of excess hood material, is preferably provided between the hood or neck seal if fitted and the fastener or skirt, to permit easy rotation or nodding of the hood with respect to the fastener or skirt.

By making the hood of an elastic material, rather than a fabric, retention of the oronasal mask against the wearer's face can be accomplished by means of the elasticity of the hood material. It is however preferred that the hood not be put to such tension, and as it will normally be intended that a helmet be used which is of the type having ear covering portions, the said retention can be accomplished by tension means operable between the respirator and the helmet. Otherwise, or when the helmet is absent, an elasticated and/or adjustable strap may be used.

It can be important, particularly for aircrew, but also probably in any case where the respirator is to be a tight fit over the wearer's ears, to ensure the passage of gas to and from the ears and thus to balance the gas pressure therein during environmental pressure changes. Ducts may be provided in the hood to attenuate pressure differences between the ear and respirator face cavity. These may be constituted by a fabric pad attached to the hood or by grooves formed in a thickened portion of the hood material perhaps with flexible tubes laid therein. These tubes may be made of plastics material, perforated in the region of the ears and have a bore of 0.5–1.0 mm.

Channels may be formed in the hood material to assist the passage of purging gas over the head beneath the hood.

According to a feature of the invention the visor may constitute a faceplate for covering substantially the whole of a user's face, and is preferably substantially rigid in structure. The recess formed therein to carry the breathing mask can be arranged to assist in maintaining this rigidity while at the same time permitting the visor, apart from the recess therein, to occupy a position quite close to the user's face, ie within 1–2 cm thereof on average. It is preferably an integral structure as distinct from a composite. Certain polymethyl methacrylates, nylons, polycarbonates and polyurethanes are suitable materials from which the visor may be fabricated, the material being, when formed, between about 0.5 and 2.5 mm and most advantageously 1.5–2.0 mm thick.

The combination of extent, integrity, three dimensional structure and rigidity in visors in a preferred embodiment of the invention has several important advantages. The optical properties of the visual portion remain substantially constant and problems at the interface of visor and certain sighting devices which the wearer may have to use are minimised. The visor can remain substantially unaffected by the weight or oscillations of any flexible feed tubes and provide a reliable substrate or datum for the operation of any respirator mounted controls or components—even to some extent if these are actually mounted on the hood. It provides a safe substrate for the penetration of the respirator by the various services thereto and for mounting various other items of equipment. Also it permits a readily checkable consistent adhesive substrate for the hood material to the visor material.

The visual portion of the visor is preferably formed as part of a sphere. The remainder of the visor, including the mask carrying portion, may be rendered opaque, for example with matt black paint, to prevent stray light entering the front of the respirator and perhaps causing undesirable reflections.

The visor may be formed in a powder injection or vacuum moulding process. To minimise scratching the visual portion this may be coated with an abrasion resistant compound of, for example, silicone.

The visor may be bonded to the hood with a suitable adhesive. A padding strip, for example of plastics foam material, may form a lining around the edge of the visor to reduce chafing potential from the visor edge and to reduce frost-bite potential in conditions of extreme cold.

The breathing mask is preferably an oro-nasal mask which, by definition, covers the nose and mouth of the user. It may be of the traditional rubber type having a returned edge for maximum mask/face sealing. An advantage of employing a rubber oro-nasal mask is that nose occlusion means, which can be important to enable certain aircrewmen to clear their ears during changes of altitude, can be provided which operate from outside the mask. Penetration of and clutter within the mask can thus be minimised to inlet and outlet, a microphone and perhaps a liquid nutrient supply facility. Suitable nose occlusion means are described in copending UK Patent Application Number 47807/78, and a liquid nutrient supply facility is described in copending UK Patent Application Number 79 06749.

The breathing air inlet part of the breathing mask may be provided with a non-return valve preventing exhalation therethrough. According to another feature of the invention it may also contain an ice guard to prevent the non-return valve from freezing closed in cold conditions.

The breathing air outlet part of the breathing mask may be provided with an inlet pressure compensated outlet non-return valve. A secondary outlet valve may also be provided, in series with the compensated valve, to prevent inhalation of environmental air due to back-leak through the primary expiratory valve. The outlet part may be continued briefly in the form of a snout beyond the outlet valve assembly. The function of the snout, which is preferably arranged to vent facing the wearer's neck, is to retain a small quantity of exhalate and thus reduce the likelihood of the outlet valves freezing in cold conditions. It is preferably attached to the visor.

It will be appreciated that purge gas is supplied to the respirator interior as distinct from the breathing mask interior and it has three important functions. Firstly by maintaining a positive pressure within the respirator it assists in the prevention of environmental access to the user's person both normally and in the event of accidental leaks. Secondly, correctly directed, the purge gas flow prevents misting or frosting of the internal surface of the visual portion of the visor. Thirdly, the flow of gas across the exposed areas of the user's face and neck greatly reduces the subjective discomfort produced by wearing such a respirator in warm or hot environments.

The purge gas is thus preferably arranged to be supplied at a pressure above that of the respirator environment but below that of the breathing gas. As indicated above the supply of purge gas to the respirator may conveniently be ducted thereto via the visor. The means for directing the gas onto the visual portion of the visor may comprise a diffuser at the purge gas inlet and, because of the otherwise advantageous confined space which the breathing mask may have to occupy, a deflector mounted or formed on the breathing mask.

According to another feature of the invention the purge gas outlet may be mounted on the visor at a location remote from the purge gas inlet whereby sweeping of substantially the whole visual portion of the visor by purge gas is encouraged.

The purge gas outlet preferably comprises a non-return valve biassed closed. According to yet another feature of the invention the valve may have a manual override facility so that the valve can be closed to prevent leakage of environmental atmosphere into the respirator in the event of failure of the purge gas supply. The manual override may include spring means whereby the valve is only closed up to a predetermined pressure within the hood.

It will be appreciated that the close-fitting construction of the respirator has important advantages not only in the minimisation of the quantity of purge gas required to perform the functions thereof in unit time but also in ensuring adequate sweeping by the purge gas of the visual portion of the visor. Despite this close-fitting construction the result of an anthropometric survey of military aircrewmen indicates that a respirator in one or two sizes only may be required.

It is also an important advantage of this invention that the respirator can be so constructed as to require no modification to standard helmets worn by military personnel, particularly aircrew, and can allow normal use of facilities thereon mounted such as earphones, bird-strike visor, anti-glare visor, and sighting devices and of vehicle, weapon and man-mounted sighting devices and indicators. For wearers with defective sight, spectacles may be mounted in the visor.

Respirators according to the present invention and incorporating all of the preferred feature herein described can be constructed so as to be donned and doffed without the provision of fastening means such as gas-tight sliding fasteners. They are suitable for use with the protective garments described in U.S. Pat. No. 3,586,596 and, more especially, the undercoverall described in U.S. Pat. No. 4,117,552.

A respirator having a similar purpose to that of the present invention is described in U.S. Pat. No. 3,739,774. That, however, is an over-helmet respirator and the present respirator has several advantages thereover as already described above. An additional but important advantage however is that the time required to gain protection against an undesirable substance in a local atmosphere can be minimized with the present under-helmet respirator, since it can be donned before a protective helmet.

A respirator in accordance with the invention, in fact an aircrewman's chemical defence respirator, will now be described by way of example with reference to the accompanying drawings, of which.

As shown in the drawings the respirator comprises a hood 10, a visor 20 and an oro-nasal breathing mask 30.

Figure 4:
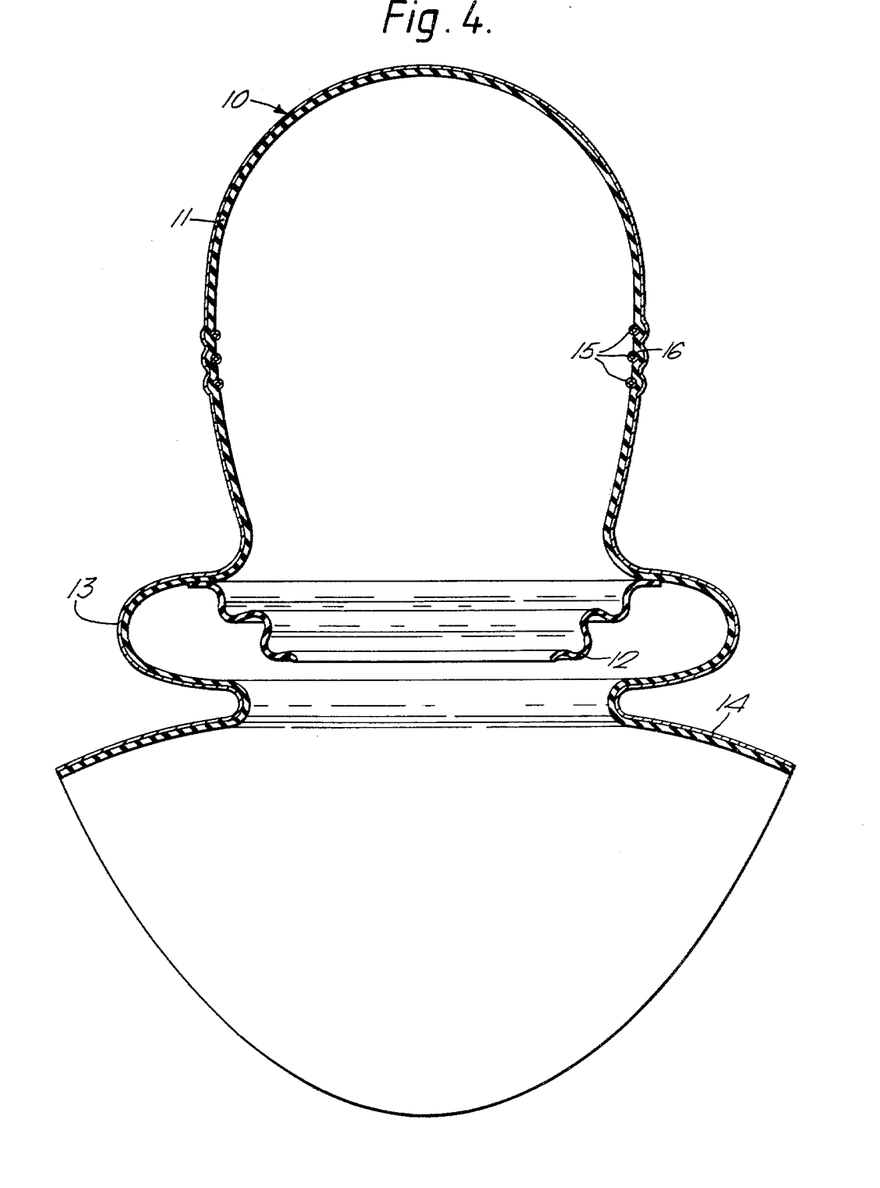
FIG. 4 is a cross section of the respirator hood.

The hood 10 comprises a head cowl 11, a neck seal 12, a bellows 13 and a skirt 14, as shown particularly in FIG. 4. The head cowl is made as a loose, ie non-extended, but close fit to a range of head sizes of designated wearers in neoprene coated with butyl and 0.3–0.4 mm thick. It envelops the head and has no fastener. The neck seal 12 is made of natural rubber and is attached to the cowl so as to seal in use around an upper part of a wearer's neck. Its purpose is to separate the hood compartment from the environment. The skirt 14 is intended to overlie the wearer's shoulders and the bellows 13 comprises sufficient material to permit full mobility of the head with respect to the body without unacceptably disturbing the configuration of the skirt 14.

In the embodiment illustrated in FIG. 4 ear pressure difference attenuating means are shown, although these may not always be necessary even with aircrewmen operating to high altitudes. The means comprise a plurality of tubes 15 lying in grooves 16, perforated in the regions normally occupied by wearer's ears, and communicating those regions to a space between the user's face and the visor 20.

The hood is thus adapted to be worn beneath (inside) a protective helmet 17, particularly one of the type which has built-in earphones, as at 18, and mobile visors 19.

The visor 20 has two principal component portions, viz a visual portion 21 and a mask accommodating portion 22. In addition the visor 20 extends below the portion 22, as at 23, to constitute a complete faceplate. The visor is a 2.0 mm thick polycarbonate injection moulding having an abrasion resistant silicone (Rubfast (Trade Mark)) exterior coating.

The visual portion 21 is shaped as part of a sphere with a radius of 100 mm and its thickness is reduced towards the periphery so that at no point does the deviation exceed 0.25 prism dioptres. It is adapted completely to cover the visual field of a wearer, that is so as nowhere to constitute an obstruction to his vision.

The mask accommodating portion 22, being formed to accommodate and carry the mask 30, imparts a degree of structural rigidity to the visor as a whole and enables the visual portion 21 to be held clear of a wearer's eyes by 20–26 mm and yet to lie beneath the helmet visors 19 when these are in use. The portion 22 together with the extension 23 are penetrated by and, when appropriate, carry connections for various services to the wearer. The portion 22 and extension 23 are painted matt black to prevent stray light and unwanted reflections reaching the wearer's eyes.

The hood 10 is attached to the visor 20 with Tivoli-Kay-5000 (Trade Mark) adhesive. A strip 24 of plastics foam, 3 mm thick and 5 mm wide, is attached to the inside of visor at the hood/visor junction to prevent visor edge/wearer skin chafing and to reduce the possibility of frost bite in cold conditions.

The breathing mask 30 is an oronasal mask, ie it covers the wearer's nose and mouth. It is made of rubber and attached to the visor 20 at its forwardmost (remotest from the wearer) face. In use the mask is held in contact with the wearer's face by mask anchorage means 25 mounted on the mask accommodating portion 22 of the visor 20. The anchorage means 25 have length adjustable links 26 detachably attachable to the helmet 17.

Breathing air is supplied to the interior of the mask 30 via the hose 31 which is attached to the visor 20 and the mask 30 by a port 32. The port 32 contains an inlet non-return valve (not shown) and an ice guard (not shown). Expiratory air leaves the mask and respirator via a port 33 (FIG. 7) which contains two non-return valves in series with a gap therebetween. The first valve is urged closed by a light spring and is compensated by breathing gas pressure from the inlet port 32. The non-return valves are arranged to permit the exhaust of exhalate to the atmosphere and prevent the intake of any atmosphere, the outer valve having the function of preventing inhalation via the inner in the event of freezing or jamming thereof open, and of minimising the dynamic leakage of the valve particularly in the event of a positive ventilation supply failure. In addition an outlet snout 34 directed toward the wearer protects the expiratory port 33 against valve icing in very cold conditions.

The forwardmost face of the portion 22 of the visor 20 also carries a microphone 35, which with the helmet earphones has associated leads 36.

Figure 1:
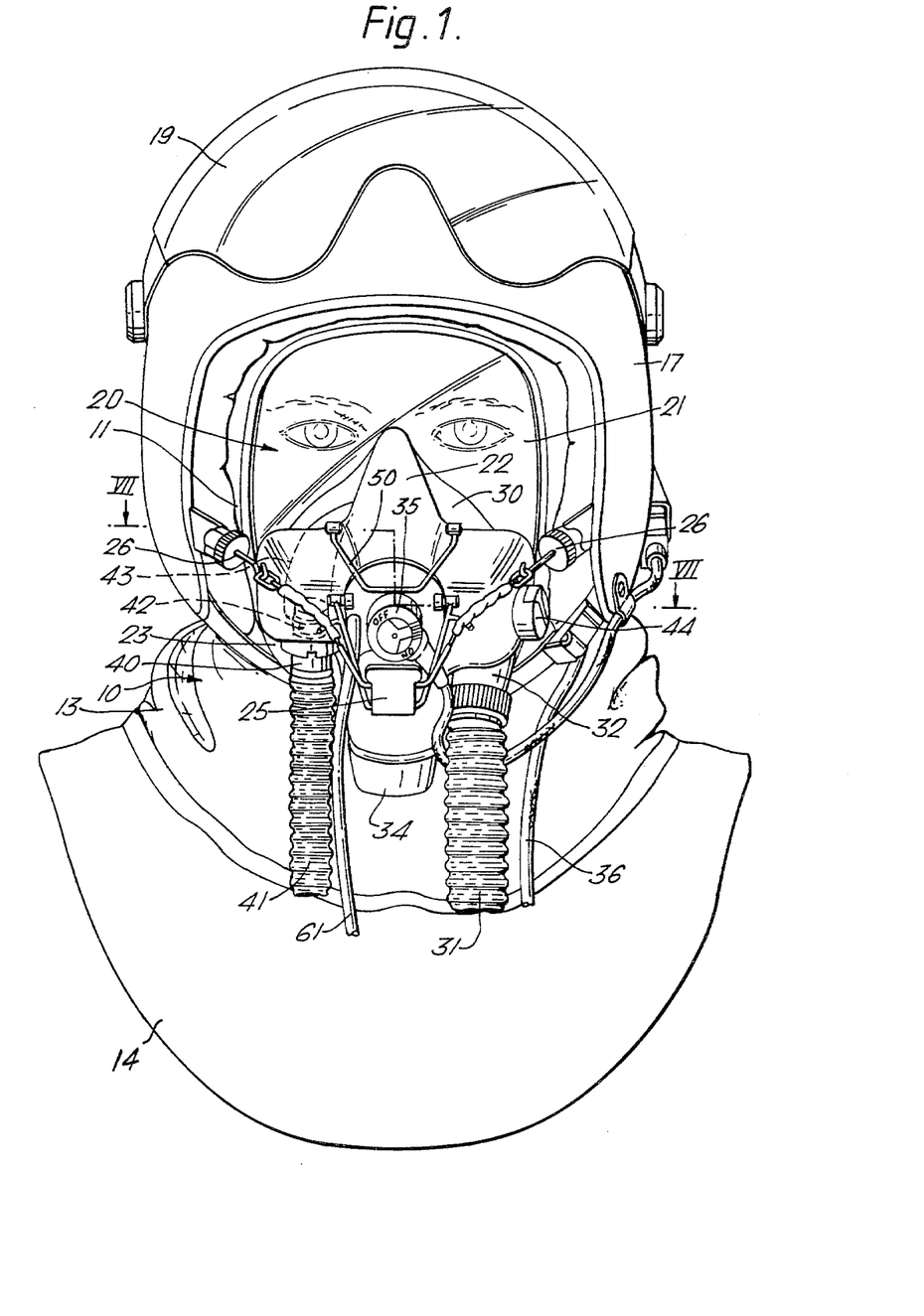
FIG. 1 is a front view of the respirator as worn beneath a protective helmet.
Figure 2:
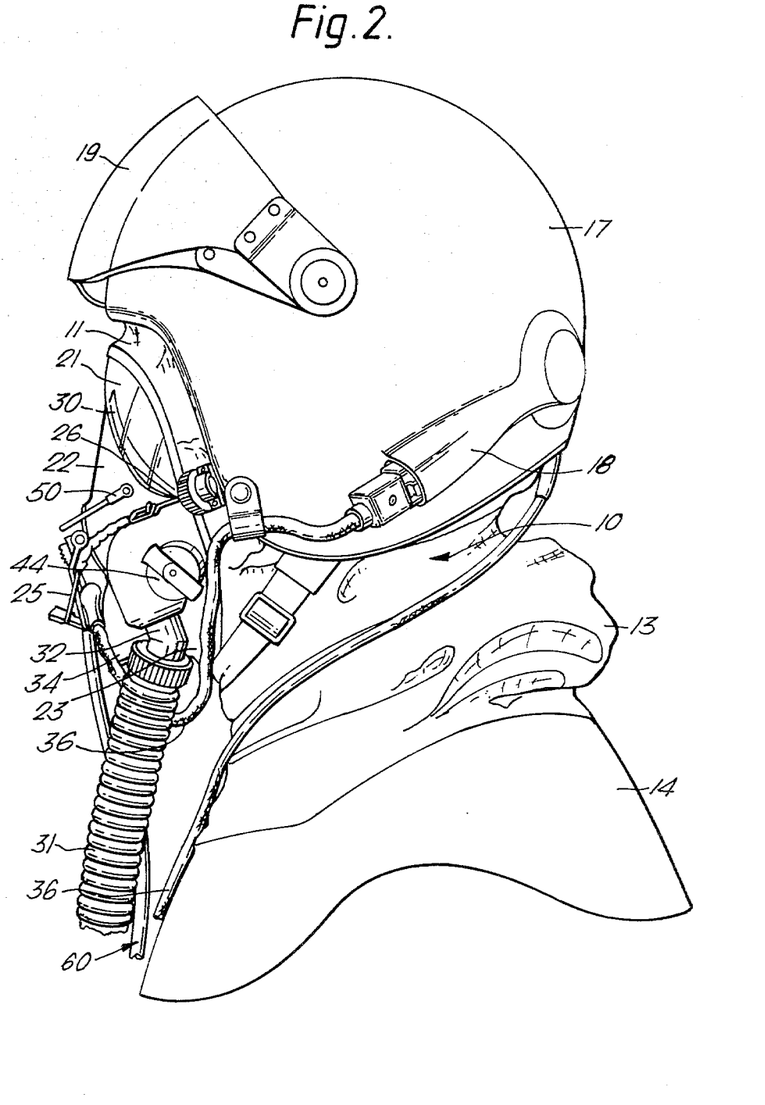
FIG. 2 is a left-hand side view of the respirator shown in FIG. 1.
Figure 3:
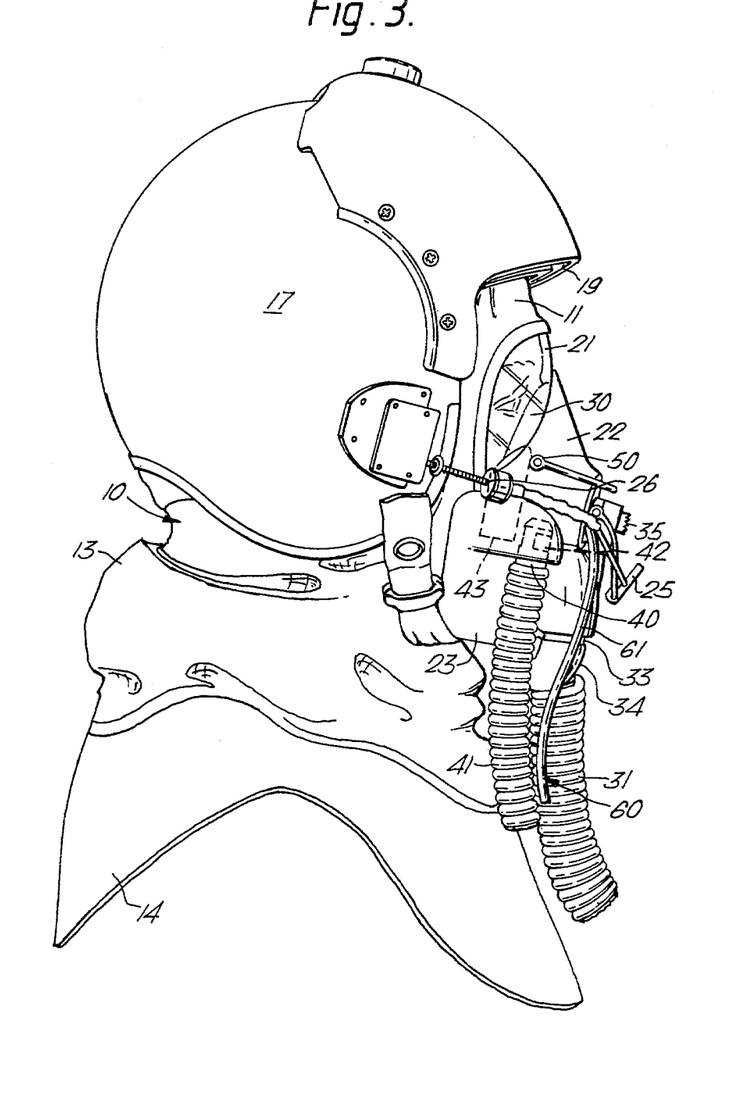
FIG. 3 is a right-hand side view of the respirator as worn beneath an 'American' helmet.
Figure 7:
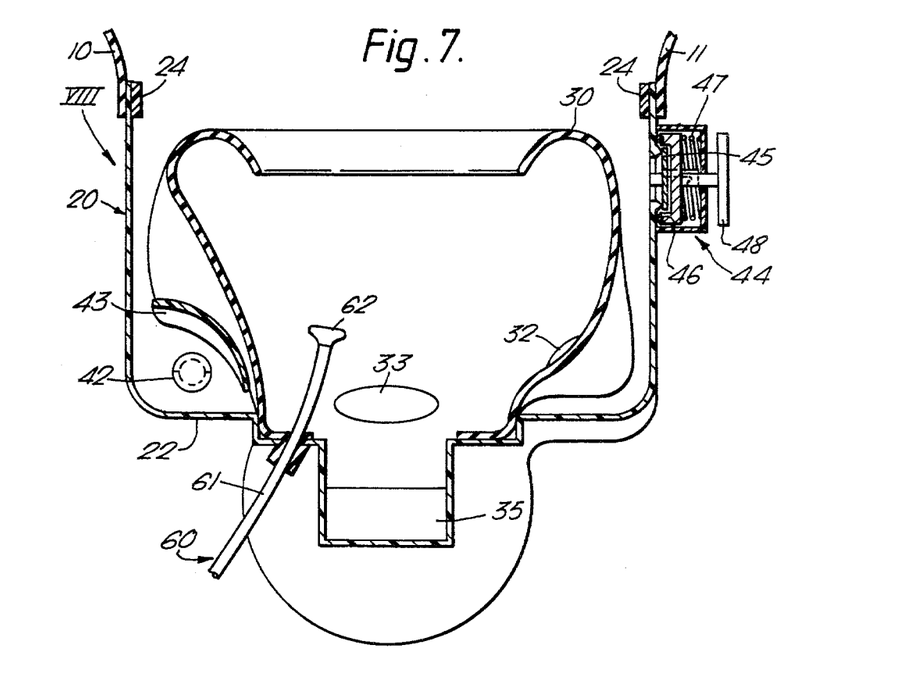
FIG. 7 is a schematic cross sectional view on VII—VII in FIG. 1
Figure 8:
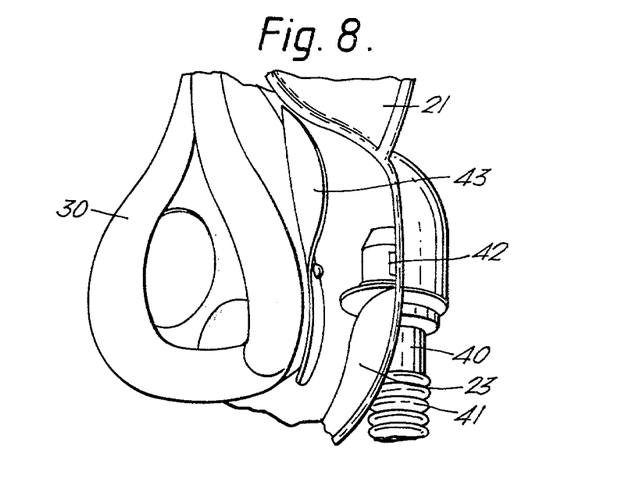
FIG. 8 is a view on VIII—VIII in FIG. 1.

The hood cavity, ie the cavity between the hood 20 and the wearer's head in use, outside the breathing mask 30, is arranged for continuous purging with filtered air, for the purposes of protection, comfort and visor demisting. For this purpose the visor 20 carries a purge gas inlet 40 to which is connected a purge gas supply hose 41. Within the mask accommodating portion 22 of the visor 20, but exterior to the mask 30, the inlet 40 terminates with a diffuser 42 (see FIGS. 7 and 8 and dotted in FIGS. 1 and 3). The mask carries a deflector 43 arranged to direct purge gas onto the visual portion 21 of the visor 20. The purge gas is exhausted via a purge gas outlet 44 mounted on the mask accommodating portion 22 of the visor 20—it is a specific function of the neck seal 12 to minimise purge gas egress via the hood neck aperture. The outlet 44 comprises, as indicated in FIG. 7, a non-return valve 45, a seal 46, a spring 47 and a control cock 48. The non-return valve is arranged to maintain within the hood cavity a purge gas pressure greater than that of the environment but less than that within the breathing mask 30. To cater for failure of the purge gas supply or water entry after escape the spring 46 is releasable by the cock 48 to close the seal 46 over the valve 45. The spring 46 is arranged to maintain a pressure predetermined to permit lifting of the seal 46 in certain under water situations. The purge gas supply system does not form part of the present invention, but for low altitude work it may comprise pumped or stored filtered air and for high altitude work a pumped mixture of oxygen and filtered air with manual and automatic devices for switching the supply to an emergency oxygen source.

Figure 5:
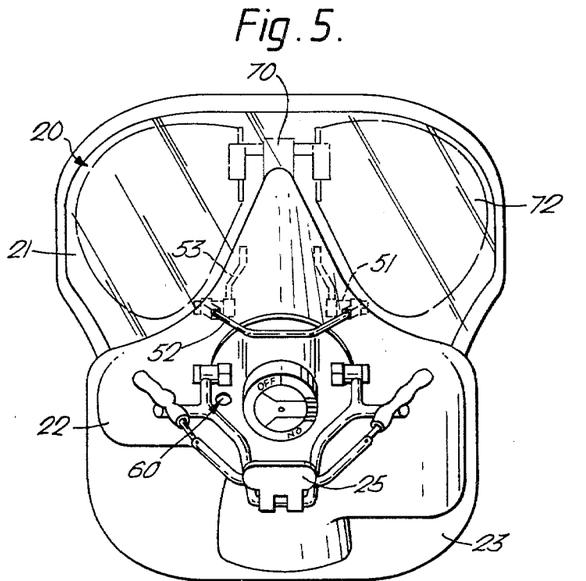
FIGS. 5 and 6 are front and part sectioned side views of the respirator visor.
Figure 6:
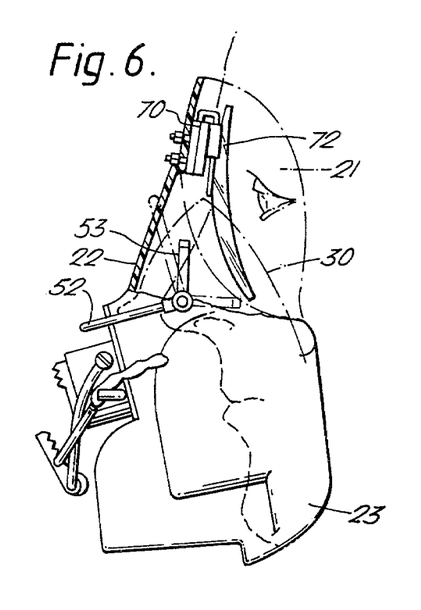

As particularly illustrated in FIGS. 5, 6 and 7 the respirator incorporates a nose occlusion facility 50, a liquid nutrient intake facility 60, and a corrective lens facility 70.

The nose occlusion facility 50, which is included so that users can clear their ears following environmental pressure changes, is the subject of co-pending UK Patent Application Number 47807/78. It comprises a pivot 51 penetrating the visor 20, a trapezoidal handle 52 mounted on the pivot 51 outside the visor and a pair of arms 53 mounted on the pivot 51 inside the visor, whereby lifting the handle 52 swivels the arms 53 down onto the mask 30 in the region of the lobes of the wearer's nose.

The liquid nutrient intake facility 60 comprises a flexible tube 61 penetrating the visor 20 at a faceplate thereof, in such a manner that pushing the tube inwards enables entry of a mouthpiece 62 thereof into the wearer's mouth. The mouthpiece 62 also prevents the tube being pulled out of the respirator. The lower ends of the tube 61 carries a normally closed bottle connector, not shown.

The corrective lens facility 70 comprises a mount 71 moulded in the visor 20, to which may be attached when necessary corrective lens 72 for users with visual defects.

The respirator can be donned by the wearer unassisted, by being pulled over the head. Once it is on he is able to see to fit the helmet over the resistor whilst utilising the supply of breathable and purge gases if an undesirable substance is already present in the local atmosphere.

After donning the helmet the anchorage means 25, 26 are fastened to maintain the location and facial contact pressure of the mask 30. Respiratory gas is supplied to the mask 30 via the inlet 31, 32 and exhalate is expelled via the non-return valve assembly 33, 34. Purge gas is supplied via the inlet hose 41 and port 40. It is directed by the diffuser 42 onto the visor surface against which it is retained by the deflector 43 as it arrives at the visual area 21. The main body of purge gas flow thus sweeps the visual area for anti mist purposes, and is not blown into the wearer's eyes, though the flow is sensed as a comforting medium at the wearer's skin. The purge gas exits the hood cavity at the outlet 44. In the event of purge gas supply failure the valve 45 may be closed off by operation of the control 48, which allows the spring 47 to bear on the seal member 46 and close over the valve 45. The spring 47 converts the outlet to a pressure relief valve which will open at a predetermined hood cavity pressure.

Because of the small volume to be purged in use it has been found possible, in the particular embodiments of the invention described above, to use a 12 mm bore tube for the purge gas supply 23, as compared with an 18 mm bore tube for the breathing gas supply 19.

The nose occluder 50 is particularly for use by wearers who need such assistance to clear their ears as a result of environmental pressure changes. This is often effected by occluding the nose and bringing lung pressure to bear on the head breathing air passages. The lever 52 is lifted, which swivels the arms 53 downward, causing them to pinch the mask 30, and thereby the wearer's nose.

The tubes 15 in the hood 11 act to attenuate pressure differences between the ear regions and the visor interior and as constructed the hood with the tubes 15 described does not unacceptably affect hearing.

In order to take sustenance or water whilst wearing the respirator the wearer, having plugged the tube 60 of the drink facility 61 into a supply container, will push the tube 60 into the visor until the mouthpiece 62 enters his mouth. He can then draw up liquid as required, which done he can withdraw the mouthpiece 62 by pulling the tube 60.

I claim:

1. A respirator for wearing beneath a protective helmet and for protection against an undesirable substance in a local atmosphere and comprising
    a hood with a neck aperture and made of a flexible material,
    a visor,
    said hood and said visor both being made of material impervious to the undesirable substance and attached one to another in a manner impervious to the undesirable substance to form a respirator assembly adapted to envelop and fit closely the head of a wearer,
    said visor having a transparent visual portion for covering the visual field of a wearer and a breathing mask carrying portion recessed to accommodate and carry a breathing mask,
    a breathing mask carried by said visor mask carrying portion,
    means mounted on said visor for supplying purge gas to the interior of said respirator,
    means for directing purge gas onto said transparent visual portion,
    means for permitting egress of purge gas, and
    seal means around the neck aperture for preventing atmosphere exterior thereto reaching the interior of said respirator assembly via a neck aperture thereof.

2. A respirator as claimed in claim 1 and wherein the hood is made of butyl rubber.

3. A respirator as claimed in claim 1 and wherein the hood is made of neoprene.

4. A respirator as claimed in claim 1 and wherein the hood is made of a neoprene and butyl composite.

5. A respirator as claimed in claim 1 and wherein the hood material is 0.2–0.4 mm thick.

6. A respirator as claimed in claim 1 and wherein said means for preventing ingress of atmosphere by the neck aperture thereof comprises an inwardly directed rubber flange.

7. A respirator as claimed in claim 1 and having a skirt for overlying the wearer's shoulders.

8. A respirator as claimed in claim 1 and having bellows means below the neck aperture thereof.

9. A respirator as claimed in claim 1 and having a padding strip attached inside the respirator approximate the hood/visor junction.

10. A respirator as claimed in claim 9 and wherein said padding strip is formed of plastics foam material.

11. A respirator as claimed in claim 1 and having pressure difference attenuating means communicating between ear regions and face regions thereof.

12. A respirator as claimed in claim 11 and wherein said pressure difference attenuating means comprises at least one tube perforated in a said ear region.

13. A respirator as claimed in claim 12 and wherein said at least one tube has a bore of 0.5–1.00 mm.

14. A respirator as claimed in claim 12 and wherein said hood material is formed with at least one channel bedding said at least one tube.

15. A respirator as claimed in claim 1 and having mask retention means for retaining said breathing mask to the face of a wearer.

16. A respirator as claimed in claim 1 and adapted to be worn beneath and within a protective helmet and wherein said mask retention means comprises tension means operable between the respirator and the helmet.

17. A respirator as claimed in claim 1 and wherein the visor constitutes a faceplate for covering substantially the whole of a wearer's face.

18. A respirator as claimed in claim 1 and wherein the visor is substantially rigid in structure.

19. A respirator as claimed in claim 1 and wherein said visor is formed of a polycarbonate material.

20. A respirator as claimed in claim 1 and wherein said visor is formed of a material 1.5–2.0 mm thick.

21. A respirator as claimed in claim 1 and wherein said visor visual portion is coated with an abrasion resistant compound.

22. A respirator as claimed in claim 19 and wherein said visor visual portion is coated with an abrasion resistant compound.

23. A respirator as claimed in claim 21 and wherein said compound comprises silicone.

24. A respirator as claimed in claim 1 and wherein said visor visual portion is shaped as part of a sphere.

25. A respirator as claimed in claim 24 and wherein said visor visual portion is shaped as part of a sphere with a radius of 100 mm.

26. A respirator as claimed in claim 1 and wherein the visor other than said visual portion is rendered opaque.

27. A respirator as claimed in claim 26 and wherein the visor other than said visual portion is painted matt black.

28. A respirator as claimed in claim 1 and wherein said breathing mask is an oro-nasal mask.

29. A respirator as claimed in claim 1 and wherein said breathing mask has a breathing air inlet 30 penetrating said visor that said visor constitutes an attachment point for a flexible breathing air supply hose.

30. A respirator as claimed in claim 1 and wherein said breathing mask has a breathing air inlet incorporating a non-return valve arranged to prevent egress of gas thereby.

31. A respirator as claimed in claim 30 and wherein said non-return valve has an ice guard.

32. A respirator as claimed in claim 1 and wherein said breathing mask has a breathing air outlet having an inlet pressure compensated non-return valve arranged to prevent ingress of gas thereby.

33. A respirator as claimed in claim 32 and wherein said breathing air outlet has a secondary non-return valve in series with and outward of said inlet pressure compensated non-return valve.

34. A respirator as claimed in claim 1 and wherein said breathing mask has a breathing air outlet terminating in a snout for retaining a small volume of exhalate in order to insulate said outlet from a cold environment.

35. A respirator as claimed in claim 34 and wherein said snout is carried on said visor.

36. A respirator as claimed in claim 34 and wherein said snout is arranged to vent toward the wearer's neck.

37. A respirator as claimed in claim 1 and wherein the means for supplying purge gas is mounted on said visor mask carrying portion.

38. A respirator as claimed in claim 1 and wherein said means for directing purge gas onto said visor visual portion comprises a diffuser.

39. A respirator as claimed in claim 1 and wherein said means for directing purge gas onto said visor visual portion comprises a deflector mounted on said breathing mask.

40. A respirator as claimed in claim 1 and wherein said means permitting egress of purge gas is mounted on said visor at a location remote from said purge gas supply means whereby the sweeping of the whole of said visor visual portion by purge gas is encouraged.

41. A respirator as claimed in claim 1 and wherein said means permitting egress of purge gas comprises a non-return valve biassed closed and arranged to maintain within the hood cavity a purge gas pressure greater than the pressure outside the respirator but less than that at which breathing air is supplied to the breathing mask.

42. A respirator as claimed in claim 41 and wherein said means permitting egress of purge gas has a manual override facility operative to close over said non-return valve.

43. A respirator as claimed in claim 42 and wherein said manual override facility has spring means operative to permit said valve to open at a predetermined pressure.

44. A respirator as claimed in claim 1 and having a microphone mounted on said visor and arranged to detect wearer's speech.

45. A respirator as claimed in claim 1 and having a nose occlusion facility.

46. A respirator as claimed in claim 1 and having a liquid nutrient intake facility.

47. A respirator as claimed in claim 1 and having a corrective lens mount facility on said visor.

* * * * *